July 27, 1943.                H. C. SWIFT                 2,325,284
                          FLUID PRESSURE SYSTEM
                    Filed May 8, 1940           2 Sheets-Sheet 1

INVENTOR.
HARVEY C. SWIFT
BY
ATTORNEY.

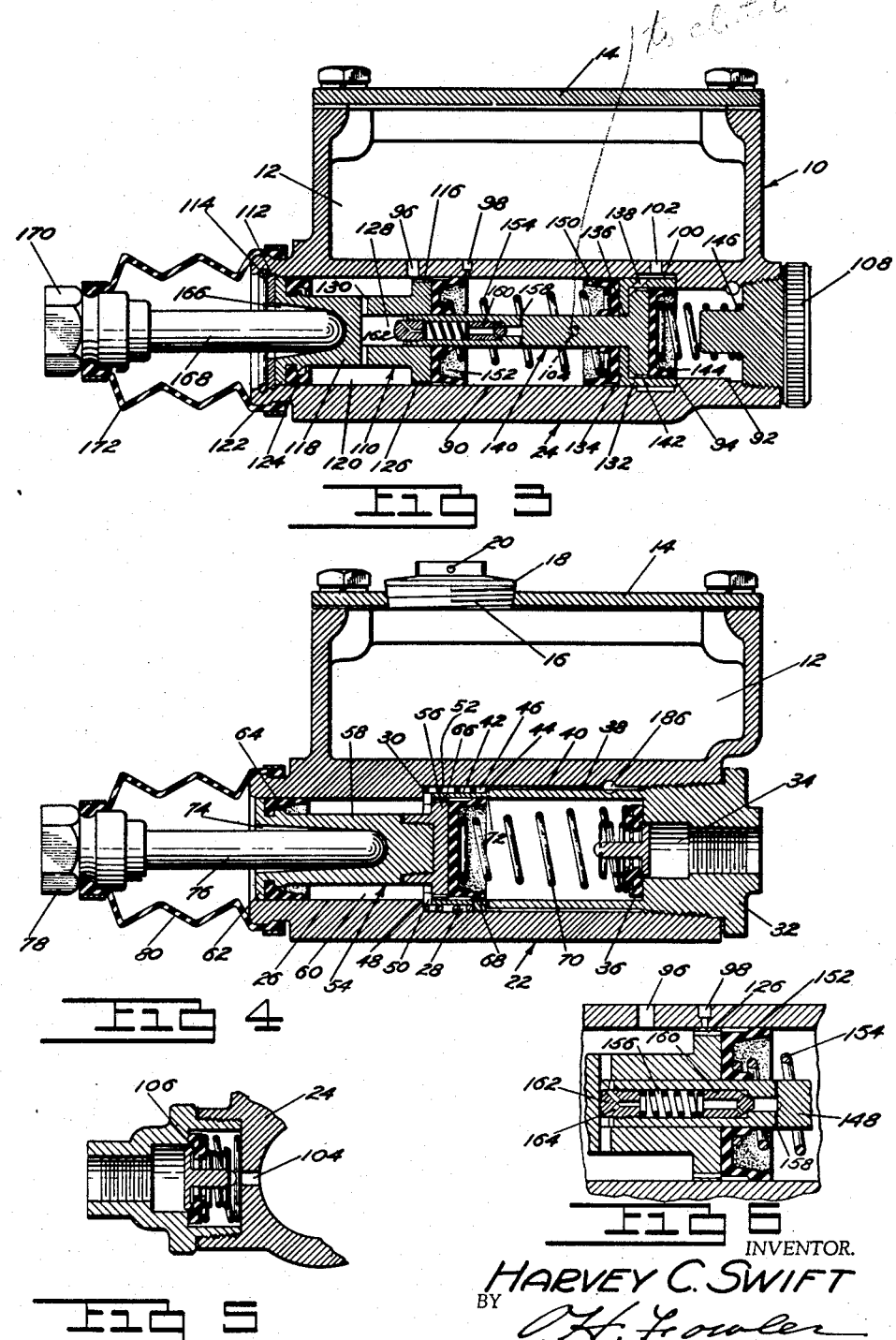

Patented July 27, 1943

2,325,284

UNITED STATES PATENT OFFICE 2,325,284

FLUID PRESSURE SYSTEM

Harvey C. Swift, Detroit, Mich., assignor to Hydraulic Brake Company, Detroit, Mich., a corporation of California Application May 8, 1940, Serial No. 334,043

18 Claims. (Cl. 60—54.5)

This invention relates to fluid pressure systems for motor vehicles.

An object of the invention is to provide a fluid pressure system for motor vehicles operative to actuate the clutch and brakes of the vehicle in sequence, also individually, or concomitantly, as may be elected by the operator.

Another object of the invention is to provide a fluid pressure system for motor vehicles including means for actuating the clutch and brakes of the vehicle successively by a single actuator.

Another object of the invention is to provide a fluid pressure system for motor vehicles including means for actuating the clutch and brakes of the vehicle operative to actuate the clutch independently of the brakes, to actuate the clutch and brakes successively, to actuate the brake independently of the clutch, to actuate the clutch and brakes concomitantly, and to actuate the clutch and brakes successively with increased actuative force for the brakes.

Yet another object of the invention is to provide a fluid pressure system including a duplex fluid pressure producing device or master cylinder having interconnected fluid pressure producing means.

A further object of the invention is to provide a fluid pressure producing device or master cylinder including two interconnected chambers, each having a discharge port and means for displacing fluid from one of the chambers through its discharge ports and also through the associated chamber and its discharge port.

Other objects of the invention will appear from the following description taken in connection with the drawings forming a part of this specification, and in which—

Fig. 3 is a vertical sectional view of the fluid pressure producing device substantially on line 3—3, Fig. 2;

Fig. 4 is a sectional view, substantially on line 4—4, Fig. 2;

Fig. 5 is a fragmentary view illustrating a valve for control of one of the discharge ports; and Fig. 6 is an enlarged sectional view of one of the pistons.

Figure 1:
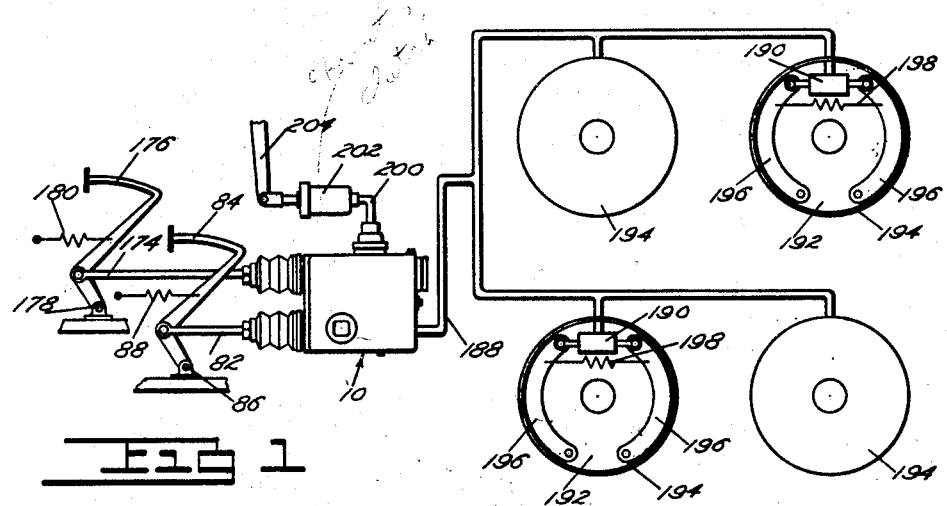
Fig. 1 is a diagrammatical illustration of a fluid pressure brake system embodying the invention.
Figure 2:
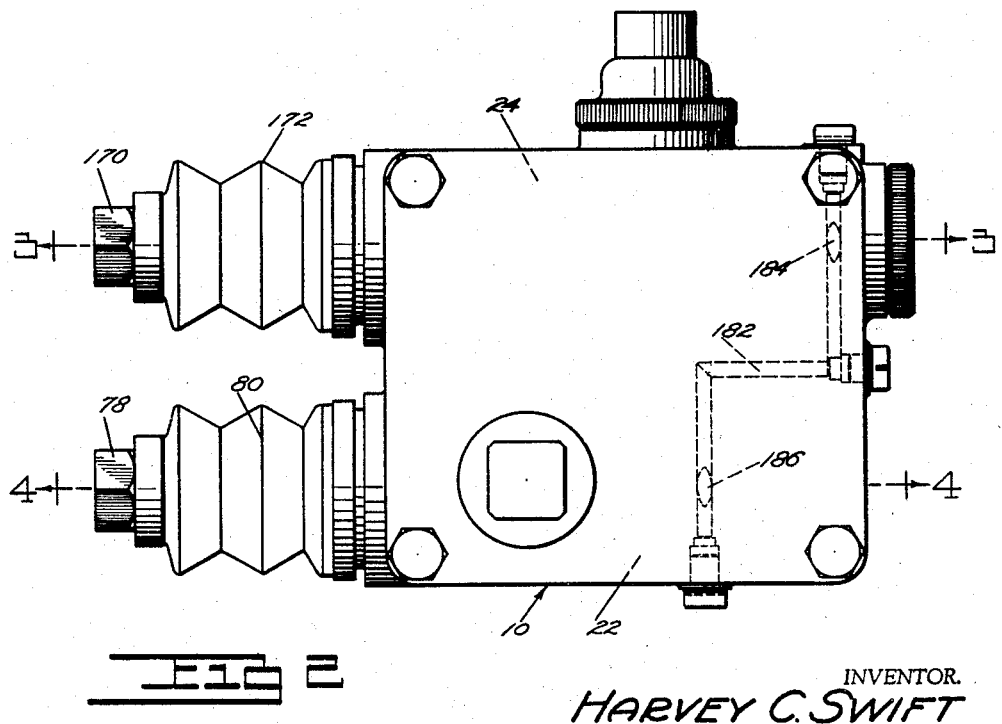
Fig. 2 is a top plan view of the fluid pressure producing device.

Referring to the drawings for more specific details of the invention, a fluid pressure producing device 10 includes a reservoir 12 having a cover 14 provided with a filling opening 16 normally closed as by a plug 18 having openings 20 therethrough for venting the reservoir to the atmosphere, and at the base of the reservoir are cylinders 22 and 24 arranged in parallel relation to one another.

The cylinder 22 has a small chamber 26 and a relatively large chamber 28 arranged concentrically to, forward of, and in direct communication with the small chamber and provides at its juncture with the small chamber an annular shoulder 30. The outer end of the large chamber 28 is closed by a head 32 having a discharge port 34 controlled as by a two-way valve 36 and a concentric sleeve 38 extended into the chamber with its free end in spaced relation to the annular shoulder 30 and providing in conjunction with the wall of the chamber 28 an annular passage 40.

A ring 42 slidable in the chamber 28 between the annular shoulder 30 and the free end of the sleeve 38 has on one end an outwardly turned flange 44 complementary to the diameter of the chamber 28 and this flange is provided with a plurality of spaced slots 46 for the passage of fluid. The other end of the ring has an inwardly turned flange 48 provided with a plurality of spaced slots 50 for the passage of fluid, and a spring 52 interposed between the annular shoulder 30 and the flange 44 on the ring serves to urge the ring to seat on the free end of the sleeve 38.

A piston 54 reciprocable in the chamber 26, the sleeve 38 and the ring 42 is held against displacement by the flange 48 on the ring 42. This piston includes a head 56, a reduced body portion 58 providing in conjunction with the wall of the chamber 26 an annular chamber 60 communicating with the annular passage 40 by way of the slots in the flanges 44 and 48 in the ring 42, and a skirt 62 having thereon a sealing cup 64 for inhibiting seepage of fluid from the cylinder past the piston.

The head 56 of the piston has a plurality of spaced passages 66 therethrough providing communications between the annular chamber 60 and the sleeve 38. A sealing cup 68 seated on the head of the piston controls the passages 66, and a spring 70 interposed between the cup 68 and the two-way valve 36 serves to retain the cup and valve against displacement and also to return the piston to its retracted position. The spring 70 has greater tensile strength than the compression strength of spring 52, accordingly when the piston is returned to its retracted position the ring 42 is moved to its seat on the annular shoulder 30 so as to establish communication between the sleeve 38 and the passage 40 by way of a gap 72 between the ring 42 and the free end of the sleeve 38.

The piston 54 has in its body 58 a recess 74 for the reception of one end of a thrust pin 76 having on its other end a coupling 78 connected by a flexible boot or shield 80 to the open end of the chamber 26 for the exclusion of dust and other foreign substances from the cylinder. A rod 82 connects the coupling to a foot pedal lever 84 rockably mounted on a stub shaft 86 and connected by a retractile spring 88 to a fixed support.

The cylinder 24 has a double diametral bore providing a chamber 90 and a relatively small chamber 92 concentric to, forward of, and in direct communication with the chamber 90 and providing at its junction therewith an annular shoulder 94. The large chamber 90 has spaced ports 96 and 98 providing communications between the chamber and the reservoir 12 and a circumferential groove or channel 100 adjacent the shoulder 94 communicating with the reservoir as by way of a port 102. The large chamber also has a discharge port 104 controlled as by a two-way valve 106, and the small chamber 92 is closed as by a head 108 provided with a concentric boss or stop extended into the chamber.

A piston 110 reciprocable in the chamber 90 of the cylinder 24 is held against displacement by a washer 112 seated on an annular shoulder in the open end of the cylinder and secured in place by a retaining ring 114 fitted in a groove in the wall of the cylinder.

The piston 110 includes a head 116 a reduced body portion 118 providing in conjunction with the wall of the chamber 90 an annular chamber 120 communicating with the reservoir by way of the port 96, and a skirt 122 supporting a sealing cup 124 for inhibiting seepage of fluid from the chamber 90. The head 116 of the piston 110 has a plurality of passages 126 therethrough providing communications between the annular chamber 120 and that portion of the chamber 90 forward of the piston, and a chamber 128 arranged concentrically in the body of the piston opens through the head 116 and communicates with the annular chamber 120 by way of ports 130.

A shell 132 reciprocable in the chamber 90 normally straddles the channel 100 and abuts or seats on the annular shoulder 94. This shell has an inner diameter corresponding to that of the chamber 92, a head 134 provided with a concentric opening 136 and a plurality of spaced ports 138 communicating with the channel 100.

A piston 140 reciprocable in the shell 132 and chamber 92 has a plurality of spaced passages 142 therethrough providing communications between the channel 100 and that portion of the chamber 92 forward of the piston. A sealing cup 144 seated on the head of the piston 140 controls the passages 142 and a spring 146 interposed between the cup and the head 108 serves to retain the cup against displacement and also to return the piston to its retracted position. This piston is limited in its forward movement by the stop on the head 108 so as to inhibit injury to the cup 144.

The piston 140 has a rod 148 extended through the opening 136 in the shell and received by the chamber 128 in the piston 110. A sealing cup 150 sleeved on the rod seats on the head of the shell 132 so as to seal the chamber 90, a sealing cup 152 seated on the head of the piston 110 controls the passages 126, and a spring 154 interposed between these sealing cups serves to retain the cups against displacement and also to return the piston 110 to its retracted position.

The rod 148 has a concentric chamber 156 communicating with the chamber 90 by way of a restricted passage 158 controlled by a spring-pressed valve 160 and the chamber 156 is closed as by a plug 162 having passages 164 therethrough providing communication between the chambers 128 and 156.

The piston 110 has in its back a recess 166 for the reception of one end of a thrust pin 168 having on its other end a coupling 170 connected by a flexible boot 172 to the open end of the cylinder for the exclusion of dust and other foreign substances. A rod 174 connects the coupling to a foot pedal lever 176 rockable on a shaft 178 and connected by a retractile spring 180 to a fixed support.

The cylinders 22 and 24 are connected adjacent their forward ends by a passage 182. As shown, the passage 182 communicates with the circumferential groove 100 in the cylinder 24 by way of a port 184 and with the annular passage 40 in the cylinder 22 by way of a port 186.

A pressure delivery pipe or conduit 188 suitably connected to the discharge port 34 of the cylinder 22 has branches connected respectively to fluid pressure actuated motors 190, preferably arranged in pairs, one pair for actuating brakes associated with the front wheels of the vehicle, and another pair for actuating the brakes associated with the rear wheels of the vehicle.

The brakes are preferably of conventional type, each including a fixed support or backing plate 192, a drum 194 associated with the backing plate, a pair of corresponding interchangeable friction elements or shoes 196 pivoted on the backing plate for cooperation with the drum, a retractile spring 198 connecting the shoes, and a motor corresponding to the motors 190 mounted on the backing plate and connected to the shoes for actuating the shoes into engagement with the drum against the resistance of the retractile spring 189.

A fluid pressure delivery pipe or conduit 200 connects the discharge port 104 of the cylinder 24 to a fluid pressure actuated motor 202 suitably connected to and operative for activating an actuator 204 of a conventional clutch, not shown.

In a normal operation, upon depressing the foot pedal lever 176, force is transmitted therefrom through the rod 174 and thrust pin 168 to the piston 110, resulting in advancing the piston on its compression stroke. During the initial movement of the piston on its compression stroke, the sealing cup 152 on the head of the piston covers the port 98, and, thereafter, as the piston advances, fluid is discharged from the chamber 90 through the discharge port 104 past the valve 106 and through the fluid delivery pipe 200 into the fluid pressure actuated motor 202, causing energization of the motor with the resultant actuation of the clutch lever 204 to disengage the clutch.

When the pressure on the fluid in the chamber 90 forward of the piston 110, the fluid delivery pipe 200, and fluid pressure actuated motor 202 reaches a predetermined degree adequate to apply slightly more than ample force to the lever 204 for disengagement of the clutch, the piston 110 engages the plug 162 in the open end of the chamber 156 of the rod 148 and advances the piston 140 on its compression stroke, and as this piston advances fluid in the chamber 92 is displaced therefrom through the port 184, the passage 182, and the port 186 into the annular passage 40, thence through the gap 72 into the sleeve 38, thence past the two-way valve 36 through the discharge port 34 and fluid pressure delivery pipe 188 and the respective branches thereof, into the fluid pressure actuated motors 190, causing energization of the motors with the resultant actuation of the friction elements 196 into engagement with the drums 194 against the resistance of the retractile springs 198 to effectively retard rotation of the drums.

Likewise when a predetermined pressure is obtained for sufficient engagement of the clutch and with a view of not placing any greater drag on the actuation of piston 140, the valve 160 cracks and fluid pressure in chamber 90 is relieved past the valve into chamber 156 through passages 164 in plug 162 into the chamber 110 thence through port 96 to the reservoir.

During the hereinabove described operation, the clutch lever 204 was actuated to disengage the clutch and held against movement so as to retain the clutch disengaged and subsequently the piston 140 was advanced to apply the brakes. It is, of course, obvious that the first phase of this operation may be accomplished without entering into the second phase.

After actuating the clutch and brakes in sequence, as above described, should it be found desirable to apply the brakes with additional force, the operator may depress the foot pedal lever 84, whereupon force is transmitted from the lever through the rod 82 and the thrust pin 76 to the piston 54 in the cylinder 22, resulting in advance of the piston 54 on its compression stroke.

During the initial movement of the piston 54 on its compression stroke, the ring 42 is advanced under the influence of the spring 52 to close the gap 72, and thereafter, as the piston 54 advances, fluid in the sleeve 38 is displaced therefrom past the two-way valve 36 through the discharge port 34 and fluid delivery pipe 188 and the respective branches thereof into the fluid pressure actuated motors 190, causing further energization of the motors with the resultant application of the friction elements to the drums with additional force, so as to more effectively retard rotation of the drums.

The latter operation may, of course, be accomplished independently of the operation wherein the clutch is first disengaged and then the brakes applied. Such an operation would only be resorted to in instances where it may be desirable to check the speed of the motor vehicle without disconnecting the power plant.

Upon conclusion of a normal operation, the foot pedal lever 176 is released and is returned to its retracted position under the influence of the rectractile spring 180. This movement of the foot pedal lever retracts the rod 174 and thrust pin 168 with the resultant release of the piston 110 and return of the piston to its retracted position under the influence of the spring 154. This releases pressure on the fluid in the chamber 90, and, accordingly, release of pressure on the fluid in the fluid delivery pipe 200 and motor 202, resulting in release of the clutch and return of fluid from the motor 202 and fluid delivery pipe 200 to the chamber 90 under the influence of the conventional return spring of the clutch.

As the piston 110 returns to its retracted position, a partial vacuum is created in the chamber 90, and this results in drawing fluid from the reservoir 12, through the port 96, into the annular chamber 120, thence through the passages 126 in the head of the piston 110, past the sealing cup 152 on the head, into the chamber 90, completely filling the chamber. This completes the operation in instances where only the clutch has been actuated. In instances where the brake has also been actuated, upon return of the piston 110 to its retracted position, the piston 140 is released, and returns to its retracted position under the influence of the retractile spring 146, and as the piston 140 returns to its retracted position, it moves the shell 132 to establish communication between the reservoir 12 and the chamber 92. During this operation fluid is returning from the fluid pressure actuated motors 190 and the fluid pressure delivery pipe 188 to the sleeve 38, thence through the gap 72, the passage 40, the port 186, the passage 182 and the port 184, into the chamber 92, and thence into the reservoir. This completes the operation in instances where the clutch and brakes have been operated in sequence.

In instances where the brakes have been actuated independently of the clutch upon conclusion of a braking operation, the foot pedal lever 84 is released and is returned to its retracted position under the influence of the retractile spring 88. This movement of the foot pedal lever is transmitted to the rod 82 and thrust pin 76 and results in retraction of the rod and pin and release of the piston 54, whereupon the piston 54 is moved to its retracted position under the influence of the retractile spring 70.

As the piston 54 moves to its retracted position, a partial vacuum is created in the sleeve 38. This results in drawing fluid from the reservoir 12 through the port 102, into the chamber 92, thence through port 184, passage 182 and port 186 into the passage 40, thence past the ring 42 into the annular chamber 60, thence through the passages 66 in the head of the piston 54, past the sealing cup 68, into the sleeve, completely filling the sleeve. As the piston 54 completes its retraction stroke, the ring 42 is moved to its retracted position so as to open the gap 72 and thereby establish communication between the reservoir and the sleeve. During this operation, fluid is returning to the sleeve 38 from the fluid pressure motors 190 and the fluid delivery pipe 188 connecting the motors to the sleeve, under the influence of the retractile springs 198. This may result in the sleeve receiving a quantity of fluid in excess of its capacity, and under this condition the excess fluid is returned to the reservoir.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure producing device comprising a pair of interconnected cylinders, pistons movable therein for creating pressure, independent discharge ports for the cylinders, fluid motors connected to the respective discharge ports, a piston in one of the cylinders between the piston therein and the communication with the other cylinder, said last-mentioned piston operable upon movement thereof to deliver fluid under pressure to the other cylinder, and means for actuating the first mentioned pistons.

2. A fluid pressure producing device comprising a reservoir, a pair of interconnected cylinders supplied therefrom, fluid pressure motors connected to the respective cylinders, pistons movable in the cylinders for creating pressure, another piston in one of the cylinders between the piston therein and the communication with the other cylinder, means for actuating the piston after a predetermined movement of the other piston in the cylinder, and means for selectively actuating the first two mentioned pistons.

3. A fluid pressure producing device comprising a reservoir, a pair of interconnected cylinders, one communicating with the reservoir, fluid pressure motors connected to the respective cylinders, pistons movable in the cylinders for creating pressure, a third piston in the cylinder communicating with the reservoir, said third piston movable in the cylinder between the piston therein and the communication with the other cylinder, means for actuating the third piston after a predetermined movement of the other piston in the same cylinder, and means for selectively actuating the first mentioned pistons.

4. A fluid pressure producing device comprising a reservoir, a pair of interconnected cylinders associated therewith, one communicating with the reservoir and a discharge port for each cylinder, fluid pressure motors connected to each of the discharge ports, a piston movable in each cylinder for creating pressure, a smaller piston in the cylinder having communication with the reservoir movable between the piston therein and the communication with the other cylinder, means inhibiting movement of the floating piston until a predetermined movement of the larger piston in the cylinder, means for actuating the piston after the predetermined movement of the larger piston, and means for actuating the first two mentioned pistons.

5. A fluid pressure producing device comprising a reservoir, a pair of cylinders associated therewith in communication with one another and one in communication with the reservoir, a controlled discharge port for each of the cylinders, fluid pressure motors connected to each of the discharge ports a piston movable in each of the cylinders for creating pressure, another piston in the cylinder communicating with the reservoir between the discharge port and the communication between the cylinders, means retaining the piston against movement until a predetermined movement of the piston in the cylinder, means for actuating the piston after a predetermined movement of the piston, and means for actuating the first two mentioned pistons.

6. A fluid pressure producing device comprising a reservoir, a pair of cylinders associated therewith in communication with one another and one in communication with the reservoir, a controlled discharge port for each of the cylinders, fluid pressure actuated apparatus connected to each of the discharge ports, a piston reciprocable in each of the cylinders, a smaller piston in the cylinder communicating with the reservoir movable between the discharge port thereof and the communication with the cylinder, means retaining the smaller piston against movement until a predetermined movement of the piston in the cylinder communicating with the reservoir, means for advancing the smaller piston after the predetermined movement of the piston in said cylinder, and means for actuating the first two mentioned pistons.

7. A fluid pressure producing device comprising a reservoir, a cylinder associated therewith having a large chamber and a relatively small chamber each communicating with the reservoir and a discharge port for the large chamber, an auxiliary cylinder communicating with the small chamber having a controlled discharge port, pistons reciprocable in the large chamber and the auxiliary chamber, a piston in the small chamber, means for advancing the piston in the small chamber after a predetermined movement of the piston in the large chamber, and means for actuating the first mentioned pistons.

8. A fluid pressure producing device comprising a reservoir, a cylinder supplied therefrom having a large chamber and a relatively small chamber, a controlled discharge port for the large chamber, an auxiliary cylinder communicating with the small chamber, a controlled discharge port for the auxiliary cylinder, pistons movable in the cylinder and auxiliary cylinder for creating pressure, a piston in the small chamber, means for actuating this piston after a predetermined movement of the piston in the large chamber, and means for actuating the pistons of the large chamber and auxiliary cylinder.

9. In a fluid pressure producing device, a reservoir, a cylinder supplied therefrom having a large chamber and a small chamber providing a shoulder at their junction, a piston movable in the large chamber, a shell movable in the large chamber normally seated on the shoulder, a piston reciprocable in the shell and small chamber, means for advancing the piston after a predetermined movement of piston in the large chamber, means for relief of pressure on the fluid in the large chamber to maintain the pressure constant, and means for actuating the piston of the large chamber.

10. In a fluid pressure producing device, a reservoir, a cylinder supplied therefrom having a large chamber and a relatively small chamber providing an annular shoulder at their junction, a piston reciprocable in the large chamber having a recess, a shell movable in the large chamber normally seated on the shoulder, sealing members on the piston and shell, a yieldable member between the sealing members, a piston movable in the shell and small chamber having a part received by the recess so as to advance the small cylinder after a predetermined movement of the piston in the large chamber, means for maintaining a constant pressure on the fluid in the large chamber after attaining a predetermined pressure, and means for actuating the piston of the large chamber.

11. A fluid pressure producing device comprising a reservoir, a cylinder supplied therefrom having a large chamber and a relatively small chamber, an auxiliary cylinder in interconnecting communication with the small chamber, independent discharge means for the large chamber and auxiliary cylinder, respective fluid motors communicating with the discharge means, pistons in the large chamber, small chamber and auxiliary cylinder for creating pressure, applicator means for actuation of the pistons in the large chamber and auxiliary cylinder, means effective upon applying the applicator means of the piston in the large chamber to initially create pressure and thereby actuate the motor communicating with the large chamber, and means on the piston after a predetermined movement of the piston engaging the piston in the small chamber to cause a subsequent movement of the piston and a development of fluid pressure forward of the piston, said creation of fluid pressure effective through the communication of the small and the auxiliary cylinder to discharge therefrom for the actuation of the motors connected to the discharge means of the auxiliary cylinder.

12. A fluid pressure producing device comprising a reservoir, a cylinder supplied therefrom having a large chamber and a relatively small chamber, a discharge port for the large chamber, an auxiliary cylinder communicating with the small chamber, a discharge port for the auxiliary cylinder, fluid pressure motors communicating with the respective discharge ports, pistons in the large chamber and auxiliary cylinder for creating pressure, a piston in the small chamber, independent means for actuating the pistons of the large chamber and auxiliary cylinder, a limited movement of the piston in the large chamber effective upon creation of pressure to solely actuate the fluid motor communicating with the discharge port of the large chamber, means thereafter upon further actuation of the piston in the large chamber effective to actuate the piston in the small chamber with a resultant creation of pressure in the small chamber acting through the auxiliary cylinder to activate the fluid motors connected to the discharge port of the auxiliary cylinder.

13. A fluid pressure producing device, a reservoir, a cylinder supplied therefrom having a large chamber and a small chamber, an auxiliary cylinder communicating with the small chamber, discharge ports for the large chamber and auxiliary cylinder, fluid motors communicating with the respective discharge ports, pistons fitted for reciprocation in the chambers and the auxiliary cylinder, independent means for actuation of the pistons in the respective large chamber and auxiliary cylinder, means effective upon a predetermined movement of the piston in the large chamber to activate the piston in the small chamber, means providing for an absolute actuation of the fluid motor communicating with the discharge port of the large chamber upon the attainment of fluid pressure in the large chamber due to the initial actuation of the piston therein and a concomitant actuation with the fluid motors communicating with the discharge port of the auxiliary cylinder upon attainment of fluid pressure in the small chamber due to the actuation of the means effective to actuate the piston in the small chamber, and means providing for absolute actuation of the fluid motors communicating with the discharge port of the auxiliary cylinder upon the actuation of the piston in the auxiliary cylinder and the consequent creation of pressure therein.

14. Fluid pressure mechanism, a reservoir, a pair of cylinders, a pair of pistons reciprocable in one cylinder, a piston reciprocable in the other cylinder, one cylinder communicating with the reservoir, the second cylinder communicating with the reservoir only through the first cylinder, a fluid pressure responsive device communicating with each cylinder and responsive to fluid pressure developed therein, the fluid pressure responsive device communicating with the second cylinder responsive through said second cylinder to fluid pressure developed by one of the pistons in the first cylinder, said piston adapted to be activated by the other piston in the cylinder.

15. Fluid pressure mechanism, a reservoir, a pair of cylinders, a pair of pistons reciprocable in one cylinder, a third piston reciprocable in the other cylinder, one cylinder communicating with the reservoir, the second cylinder communicating with the reservoir only through the first cylinder, a fluid pressure responsive device communicating with each cylinder and responsive to fluid pressure developed therein, the fluid pressure responsive device communicating with the second cylinder responsive through said second cylinder to fluid pressure developed by one of the pistons in the first cylinder and the pressure developed by the piston in the other cylinder, and means preventing delivery of fluid pressure developed by one of the pistons in the first cylinder or pressure developed in the second cylinder through the first cylinder to its fluid pressure responsive device.

16. In a fluid pressure producing device, a reservoir, a cylinder supplied therefrom having a large chamber and a relatively small chamber, an auxiliary cylinder communicating with the small chamber, a controlled discharge port for each of the large chamber and auxiliary cylinder, pistons reciprocable in the large chamber and auxiliary cylinder, and means in the small chamber for controlling the communication of the auxiliary cylinder with the reservoir through the small chamber.

17. In a fluid pressure producing device, a reservoir, a cylinder supplied therefrom having a large chamber and a relatively small chamber, an auxiliary cylinder communicating with the small chamber, the large chamber and auxiliary cylinder each having a discharge port, pistons reciprocable in the respective large chamber and auxiliary cylinder, and means in the small chamber controlled by the movement of the piston reciprocable in the large chamber, said means in the small chamber controlling communication of the auxiliary cylinder with the reservoir.

18. A fluid pressure producing device comprising a reservoir, a cylinder supplied therefrom, a cylinder communicating with the first cylinder, fluid pressure responsive means connected to the respective cylinders, fluid compression means in the cylinders, and a piston in the first cylinder responsive to the compression movement of the compression means reciprocable therein for the development of fluid pressure and delivery of fluid under pressure to the fluid responsive means connected to the second cylinder.

HARVEY C. SWIFT.